K. A. JOHANSSON.
MACHINE FOR MANUFACTURING MATCH BOXES.
APPLICATION FILED NOV. 13, 1908.
979,308.
Patented Dec. 20, 1910.
4 SHEETS—SHEET 3.
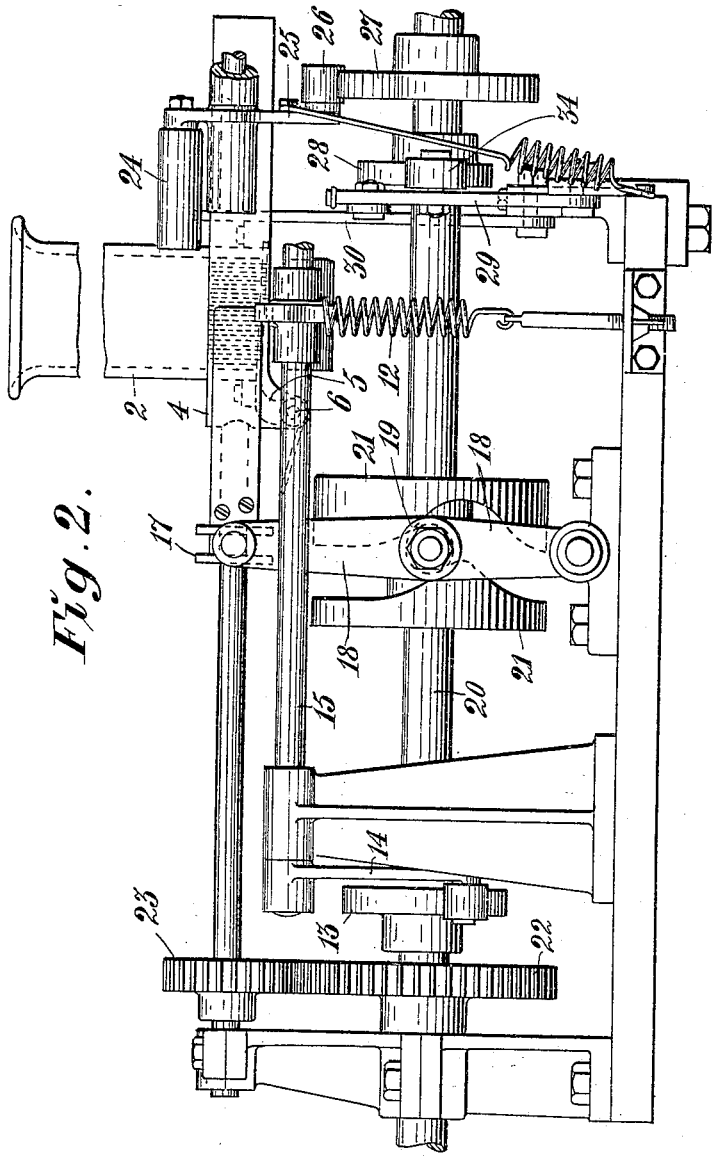
Witnesses
Herman Söderlindh
Bror Ljöberg
Inventor
Karl A. Johansson

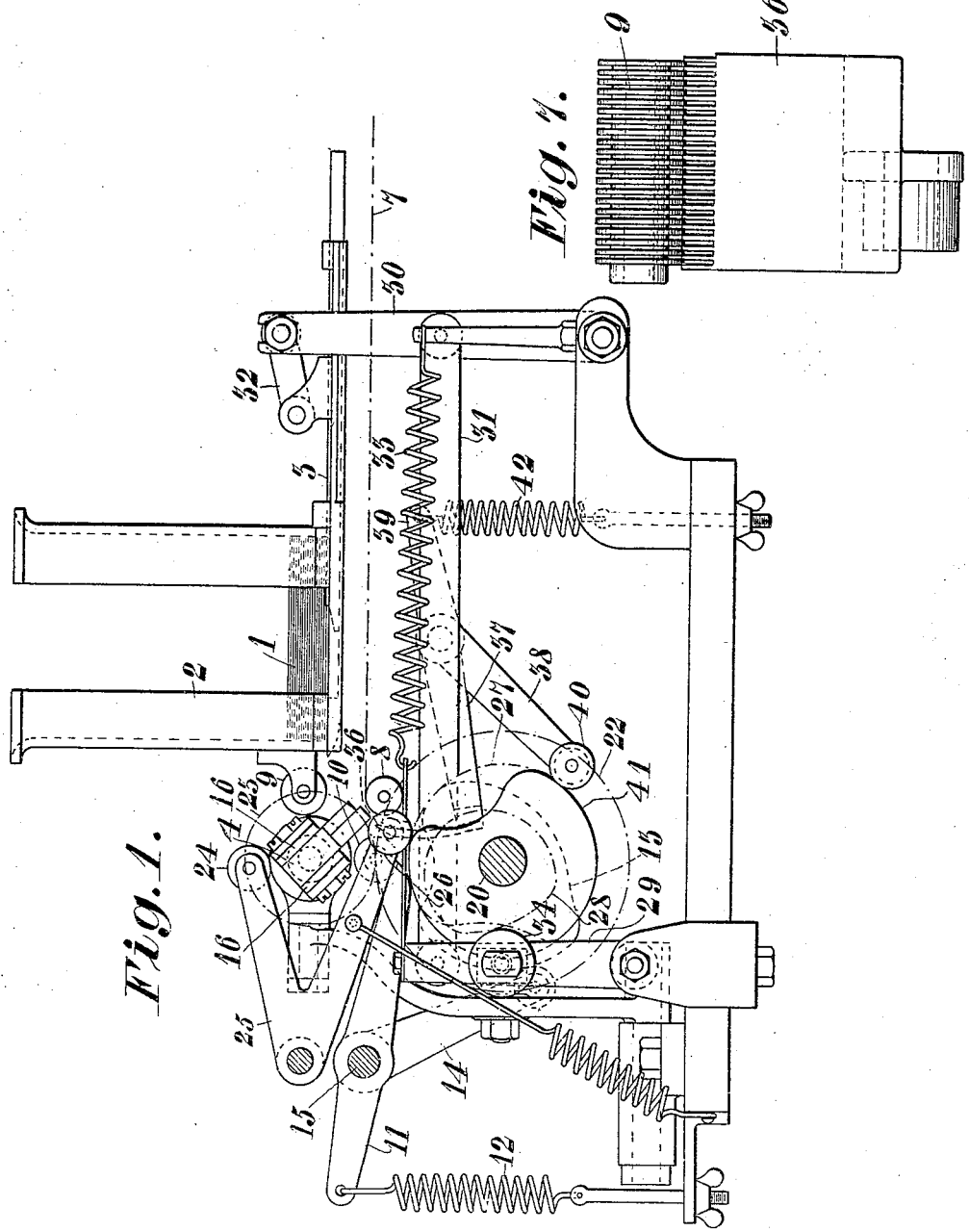

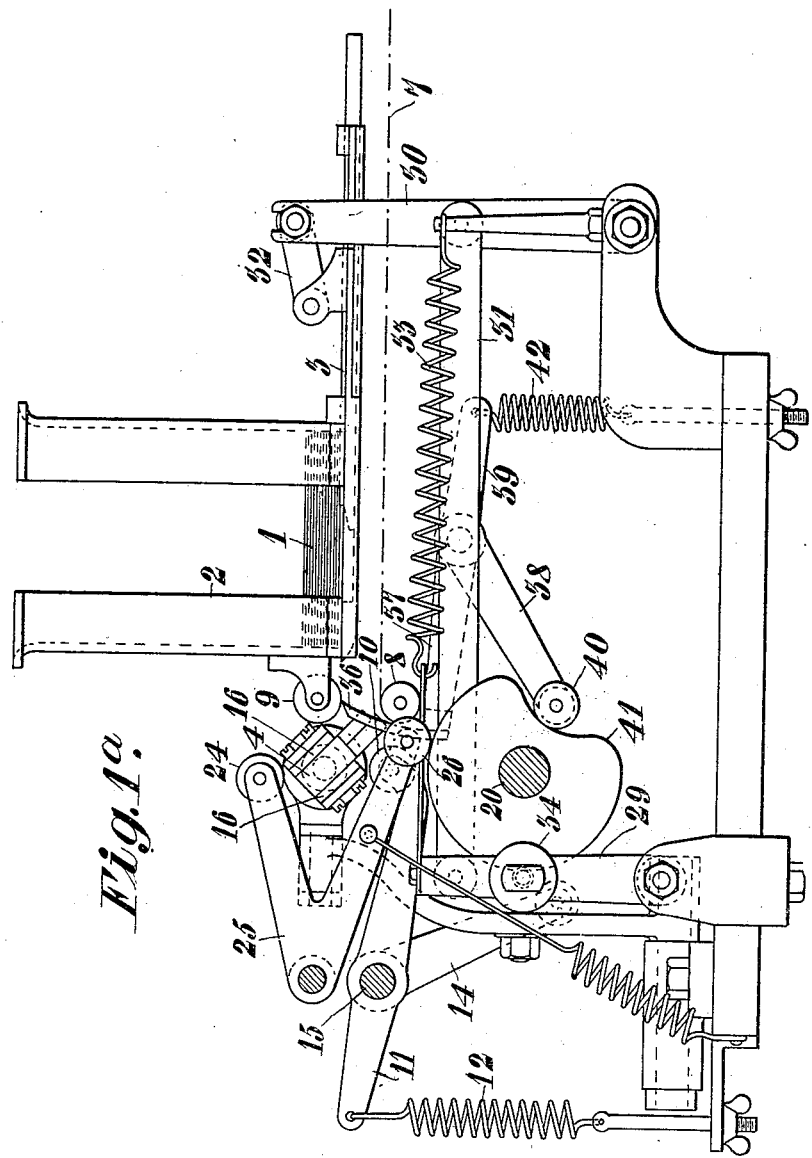

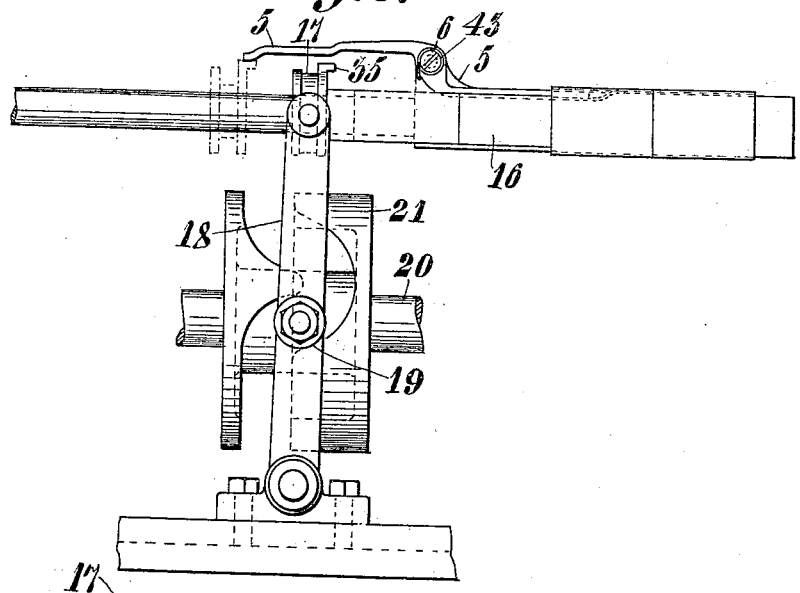
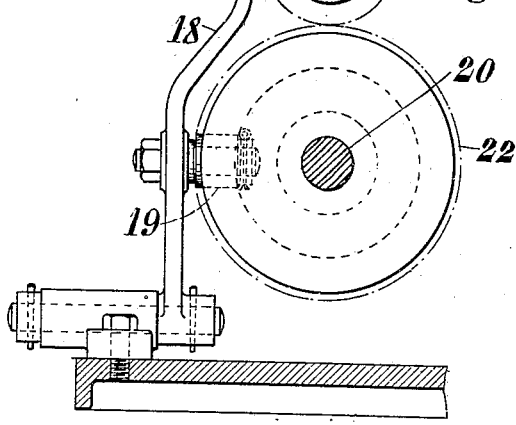
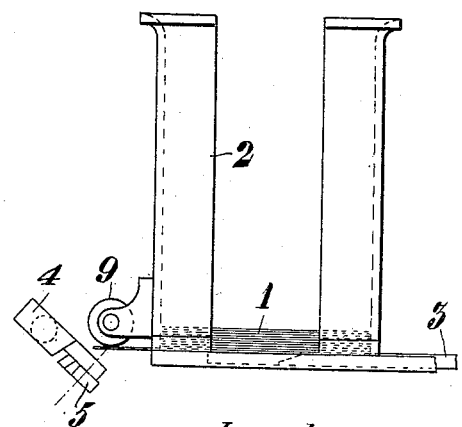
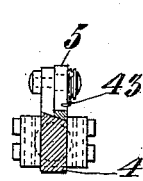

UNITED STATES PATENT OFFICE.

KARL AUGUST JOHANSSON, OF TIDAHOLM, SWEDEN, ASSIGNOR TO JÖNKÖPINGS OCH VULCANS TÄNDSTICKSFABRIKSAKTIEBOLAG, OF JÖNKÖPING, SWEDEN.

MACHINE FOR MANUFACTURING MATCH-BOXES.

979,308.  Specification of Letters Patent.  Patented Dec. 20, 1910.

Application filed November 13, 1908. Serial No. 462,465.

*To all whom it may concern:*

Be it known that I, KARL AUGUST JOHANSSON, a subject of the King of Sweden, residing at Tidaholm, in the Kingdom of Sweden, have invented new and useful Improvements in Machines for Manufacturing Match-Boxes and the Like, of which the following is a specification, reference being had to the drawings accompanying and forming a part hereof.

This invention relates to machines for manufacturing match-boxes and the like. In machines of this kind hitherto employed, in which the blank cut out and suitably scored or creased to enable the same to be readily folded on the desired lines as well as the paper coated with paste or adhesive for keeping the box together, are wound around a rotary mandrel or core, said mandrel has been caused to move in such a manner as to make two revolutions and thereupon to stop for a moment, each double revolution of the mandrel being utilized for producing the box, which is thereupon pushed off the mandrel, when the latter has stopped, in order to leave room for a new blank, said blank being attached to the mandrel before the latter commences its next double revolution. This stopping of the mandrel for each box produced obviously retards the rate of production.

The object of the invention is to remove the said drawback.

The invention consists, chiefly, in performing all operations during a continuous rotation of the mandrel, the blank being thus attached to the mandrel and the finished box pushed off while the mandrel is rotating. By this means not only is the output of the machine considerably increased, but at the same time the running of the machine will be quieter and free from thrusts.

In carrying my invention into effect I make use of a machine having a rotary mandrel. According to the invention the mandrel is rotated continuously, suitably by gear wheels from the main shaft, means being provided for attaching blanks to the mandrel during its rotation and for removing the finished boxes while the mandrel rotates. The blanks are wound around the continuously rotating mandrel and pasted together by means of a strip of paper or the like which is applied to the outer side of the blank. The smoothing of the paper strip onto the blank is, suitably, performed in two operations, or in two positions of the box on the mandrel, in order that a new blank may be supplied to the mandrel while the former blank is finished thereon.

The invention further comprises the construction and combination of parts hereinafter more particularly described.

In the drawings, I have shown, by way of example, a machine embodying the invention.

Figure 1 is a side view of the machine. Fig. 1$^a$ is a similar view of the same machine with the parts in different positions. Fig. 2 shows the same machine viewed from the lefthand side of Figs. 1 and 1$^a$. Fig. 3 is a side view of the mandrel with the slide movable thereon and the operating parts therefor. Fig. 4 is a partial sectional view of the same parts viewed from the righthand side of Fig. 3. Fig. 5 is a side view of the magazine and the gripper. Fig. 6 is a partial sectional view of the gripper. Fig. 7 is a front view of the device for cutting off the strip of paper pasted onto the blank.

Referring to the drawings, the blanks 1, suitably thin pieces of wood, are supplied from a magazine 2 by means of a reciprocating slide 3. This slide may be driven in any suitable manner, for instance from a cam 28 attached to the main shaft 20 of the machine, as shown in Fig. 1. In the embodiment illustrated the cam 28 acts on a roller 34 carried by a lever 29 which is connected by a link 31 to second lever 30 connected by another link 32 to the slide 3. The roller 34 is kept pressed against the cam 28 by means of a spring 33. When the blank 1 has been brought into a suitable position in relation to the mandrel 4, it is clamped onto the latter by any suitable means. In the embodiment shown (Figs. 3 to 6) the clamping of the blank onto the mandrel is performed by a spring-operated lever 5 adapted to swing about a pivot 6. The lever 5 is actuated by a shoulder 35 projecting from a slide 17 movable in the longitudinal direction of the mandrel as hereinafter more particularly described. When the slide 17 moves backward (toward the left in Fig. 3) the shoulder 35 presses on the lever, as shown by dotted lines, causing the lever to swing about its fulcrum 6, against the action of its spring 43, so as to clamp the blank, the latter being thereby caused to partake in the movement of the mandrel 4 so as to be shaped around the latter. In a suitable position of the blank 1 in relation to the paper strip 7 the latter is pressed by a roller 8 against the blank 1 and thereby caused to stick to the latter and is wound around the mandrel 4 together with the blank and pulled forward until it is cut off or severed against the roller 9. In the embodiment shown the severing of the paper against the roller 9 is effected by a toothed knife 36 attached to one arm 37 of a three-armed lever 37, 38, 39. Carried by another arm 38 of the said lever is a roller 40 running on the circumference of a cam 41 on the shaft 20. Attached to the third arm 39 of the said lever is a spring 42 serving to keep the roller 40 pressed against the cam 41. In a certain position of the mandrel 4, the roller 40 enters a recess in the cam 41, as shown in Fig. 1ª, whereby the lever 37, 38, 39 is swung by the spring 42 into a position in which the knife 36 engages the roller 9, as shown in Fig. 7, and severs the paper.

The shaping of the blank around the mandrel 4, to which it has been clamped in the manner hereinbefore set forth and the smoothing of the paper, cut to a suitable length, onto the blank is performed by a roller 10 attached to a double-armed lever 11, said lever pressing the roller 10, under the action of the spring 12, against the mandrel 4, when it is not kept away therefrom by the action of the cam 13 on the arm 14, said latter arm being firmly connected to the lever 11 by means of the axle 15. When the mandrel 4 has turned one revolution and a half, the blank 1 is wound entirely around the mandrel and the paper is smoothed about the blank leaving only a short lap. The smoothing roller 10 is now removed, and the nearly finished box is slid a distance equal to the width of the box in the longitudinal direction of the mandrel before the latter has completed two revolutions, the mandrel being, thus, in the same position as before, ready to receive a new blank. The sliding of the box along the mandrel may be performed in any suitable way, for instance by a pair of springs 16 extending along the mandrel, said springs being attached to a slide 17 which is reciprocated by an arm 18 carrying a roller 19 engaging a cam slot in a cylinder 21 attached to the main shaft 20. The movement of the mandrel 4 may be transmitted from the main shaft 20 by means of spur wheels 22, 23, the former 22 of which has, suitably, twice as many cogs as the latter 23, so that the mandrel 4 will make two revolutions for each revolution of the main shaft. Just opposite the new position of the box on the mandrel is a smoothing roller 24 carried by an angle lever 25, a second roller 26 carried by the said angle lever bearing on the cam 27. According as the boxes are slid by the springs 16 along the mandrel 4, the finished boxes are caused to slide farther along the said mandrel until they drop therefrom. The movement of the slide 3 during the time necessary for attaching the blank 1 to the mandrel 4 must, obviously, be such that the blank and the part of the mandrel to which it is to be attached move with the same speed in order that the position of the blank on the mandrel may always be the same.

Although I have described the invention as particularly applicable to the manufacture of match-boxes, it is obvious that boxes for other purposes may be manufactured in the same way and by the same machine, and I, therefore, do not limit my invention to the manufacture of match-boxes.

I claim:

1. In a machine for manufacturing boxes the combination of a mandrel, means for imparting continuous rotation to the said mandrel, means for attaching blanks thereto during its rotation, means for applying a strip coated with an adhesive to the outer side of the blank, means for smoothing the said strip onto the blank while the latter is wound around the mandrel, means for sliding the ready boxes along the mandrel, and means for smoothing the strip in the second position of the box on the mandrel before it is pushed off.

2. In a machine for manufacturing boxes the combination of a mandrel, means for imparting continuous rotation to the said mandrel, a gripper for attaching blanks thereto during its rotation, means for applying a strip coated with an adhesive to the outer side of the blank, a roller for smoothing the said strip onto the blank while the latter is wound around the mandrel, means for sliding the ready boxes along the mandrel, and a second roller for smoothing the strip, in the second position of the box on the mandrel, before it is pushed off.

3. In a machine for manufacturing boxes open at the ends, the combination of a mandrel, means for imparting continuous rotation to the said mandrel, means for attaching blanks thereto during its rotation, means for applying a strip coated with an adhesive to the outer side of the blank, means for smoothing the said strip onto the blank while the latter is wound around the mandrel, means for sliding the blank wound around the mandrel, with the strip attached to its outer side, into a second position on the said mandrel before the latter has made two whole revolutions, and means for finishing the box in its second position on the said mandrel while a new blank is wound around the mandrel at the part thereof just left by the ready-wound blank.

KARL AUGUST JOHANSSON.

Witnesses:
SVEN BELLINDER,
CARL LUNDMARKER.